(12) United States Patent
Leiserson et al.

(10) Patent No.: US 11,861,051 B2
(45) Date of Patent: Jan. 2, 2024

(54) BUFFER ACCESS FOR SIDE-CHANNEL ATTACK RESISTANCE

(71) Applicant: Cryptography Research, Inc, San Jose, CA (US)

(72) Inventors: Andrew John Leiserson, San Francisco, CA (US); Mark Evan Marson, Carlsbad, CA (US)

(73) Assignee: Rambus Inc., San Jose, CA (US)

(*) Notice: Subject to any disclaimer, the term of this patent is extended or adjusted under 35 U.S.C. 154(b) by 182 days.

(21) Appl. No.: 16/922,205

(22) Filed: Jul. 7, 2020

(65) Prior Publication Data

US 2020/0401733 A1 Dec. 24, 2020

Related U.S. Application Data

(63) Continuation of application No. 14/955,269, filed on Dec. 1, 2015, now Pat. No. 10,747,907.

(60) Provisional application No. 62/092,739, filed on Dec. 16, 2014.

(51) Int. Cl.
| | |
|---|---|
| H04L 29/06 | (2006.01) |
| G06F 21/75 | (2013.01) |
| G06F 21/78 | (2013.01) |
| H04L 9/00 | (2022.01) |
| G09C 1/00 | (2006.01) |
| H04L 9/06 | (2006.01) |

(52) U.S. Cl.
CPC ............ G06F 21/755 (2017.08); G06F 21/78 (2013.01); G09C 1/00 (2013.01); H04L 9/003 (2013.01); H04L 9/0618 (2013.01); H04L 2209/08 (2013.01)

(58) Field of Classification Search
CPC ......... G06F 21/755; G06F 21/78; G09C 1/00; H04L 9/003; H04L 9/0618; H04L 2209/08

See application file for complete search history.

(56) References Cited

U.S. PATENT DOCUMENTS

| | | | |
|---|---|---|---|
| 5,617,453 | A | 4/1997 | Roobrouck |
| 6,061,449 | A * | 5/2000 | Candelore ............... G06F 21/72 |
| | | | 713/168 |
| 8,694,707 | B2 | 4/2014 | Bowler et al. |
| 8,726,040 | B2 | 5/2014 | Dolgunov et al. |
| 9,515,818 | B2 | 12/2016 | Kindarji et al. |
| 2009/0304180 | A1 | 12/2009 | Kunigk et al. |

(Continued)

FOREIGN PATENT DOCUMENTS

WO WO-2014-075891 A1 5/2014

Primary Examiner — Joseph P Hirl
Assistant Examiner — Leynna Truvan
(74) Attorney, Agent, or Firm — The Neudeck Law Firm, LLC

(57) ABSTRACT

A cryptographic accelerator (processor) retrieves data blocks for processing from a memory. These data blocks arrive and are stored in an input buffer in the order they were stored in memory (or other known order)—typically sequentially according to memory address (i.e., in-order.) The processor waits until a certain number of data blocks are available in the input buffer and then randomly selects blocks from the input buffer for processing. This randomizes the processing order of the data blocks. The processing order of data blocks may be randomized within sets of data blocks associated with a single read transaction, or across sets of data blocks associated with multiple read transactions.

20 Claims, 13 Drawing Sheets

(56) References Cited

U.S. PATENT DOCUMENTS

2013/0129085 A1* 5/2013 Swaminathan ....... H04L 9/0637
  380/42
2014/0006797 A1* 1/2014 Cordella ............. G06F 12/1408
  713/189

* cited by examiner

```
┌─────────────────────────────────────────────┐
│ RECEIVE, AS A FIRST SET, FROM A MEMORY, AND IN A │
│ MEMORY ORDER, A FIRST INPUT SET OF DATA BLOCKS │
│                    802                       │
└─────────────────────────────────────────────┘
                      │
┌─────────────────────────────────────────────┐
│ RECEIVE, AS A SECOND SET, FROM THE MEMORY, AND │
│   IN THE MEMORY ORDER, A SECOND INPUT SET OF │
│                 DATA BLOCKS                  │
│                    804                       │
└─────────────────────────────────────────────┘
                      │
┌─────────────────────────────────────────────┐
│  GENERATE, IN A PROCESSING ORDER THAT SPANS  │
│ BOTH THE FIRST INPUT SET OF DATA BLOCKS AND THE │
│ SECOND INPUT SET OF DATA BLOCKS, A PROCESSED │
│       SET OF DATA BLOCKS THAT COMPRISE       │
│ CRYPTOGRAPHICALLY PROCESSED VERSIONS OF THE  │
│ FIRST INPUT SET OF DATA BLOCKS AND THE SECOND │
│             INPUT SET OF DATA BLOCKS         │
│                    806                       │
└─────────────────────────────────────────────┘
                      │
┌─────────────────────────────────────────────┐
│ STORE, AS A THIRD SET, TO THE MEMORY, AND NOT IN │
│    THE MEMORY ORDER, A SUBSET COMPRISING     │
│ CRYPTOGRAPHICALLY PROCESSED VERSIONS OF THE  │
│  FIRST INPUT SET OF DATA BLOCKS AND THE SECOND │
│             INPUT SET OF DATA BLOCKS         │
│                    808                       │
└─────────────────────────────────────────────┘
                      │
┌─────────────────────────────────────────────┐
│ STORE, AS A FOURTH SET, TO THE MEMORY, AND NOT │
│   IN THE MEMORY ORDER, A REMAINDER SUBSET    │
│ COMPRISING THE CRYPTOGRAPHICALLY PROCESSED   │
│ VERSIONS OF THE FIRST INPUT SET OF DATA BLOCKS │
│       AND THE SECOND INPUT SET OF DATA BLOCKS │
│                    810                       │
└─────────────────────────────────────────────┘
```

FIGURE 8

BUFFER ACCESS FOR SIDE-CHANNEL ATTACK RESISTANCE

BRIEF DESCRIPTION OF THE DRAWINGS

FIG. 8 is a flowchart illustrating a method of randomizing the order of cryptographic processing while storing the data blocks out of memory order.

DETAILED DESCRIPTION OF THE EMBODIMENTS

In an embodiment, a cryptographic accelerator (processor) retrieves data blocks for processing from a memory. These data blocks arrive and are stored in an input buffer in the order they were stored in memory (or other known order)—typically sequentially according to memory address (i.e., in-order.) The processor waits until a certain number of data blocks are available in the input buffer and then randomly selects blocks from the input buffer for processing. This randomizes the processing order of the data blocks. The processing order of data blocks may be randomized within sets of data blocks associated with a single read transaction, or across sets of data blocks associated with multiple read transactions.

Randomizing the processing order of the data blocks provides resistance to side-channel analysis techniques—such as differential power analysis (DPA). This randomization of processing order provides resistance to DPA and related attacks by making it difficult for an attacker to match up the side-channel information collected with the precise block of data being processed.

In an embodiment, the processed data blocks are written to memory sequentially (i.e., in-order.) In another embodiment, the processed data blocks are written to memory out-of-order. The processed data blocks written to memory out-of-order may be reordered by software.

Figure 1:
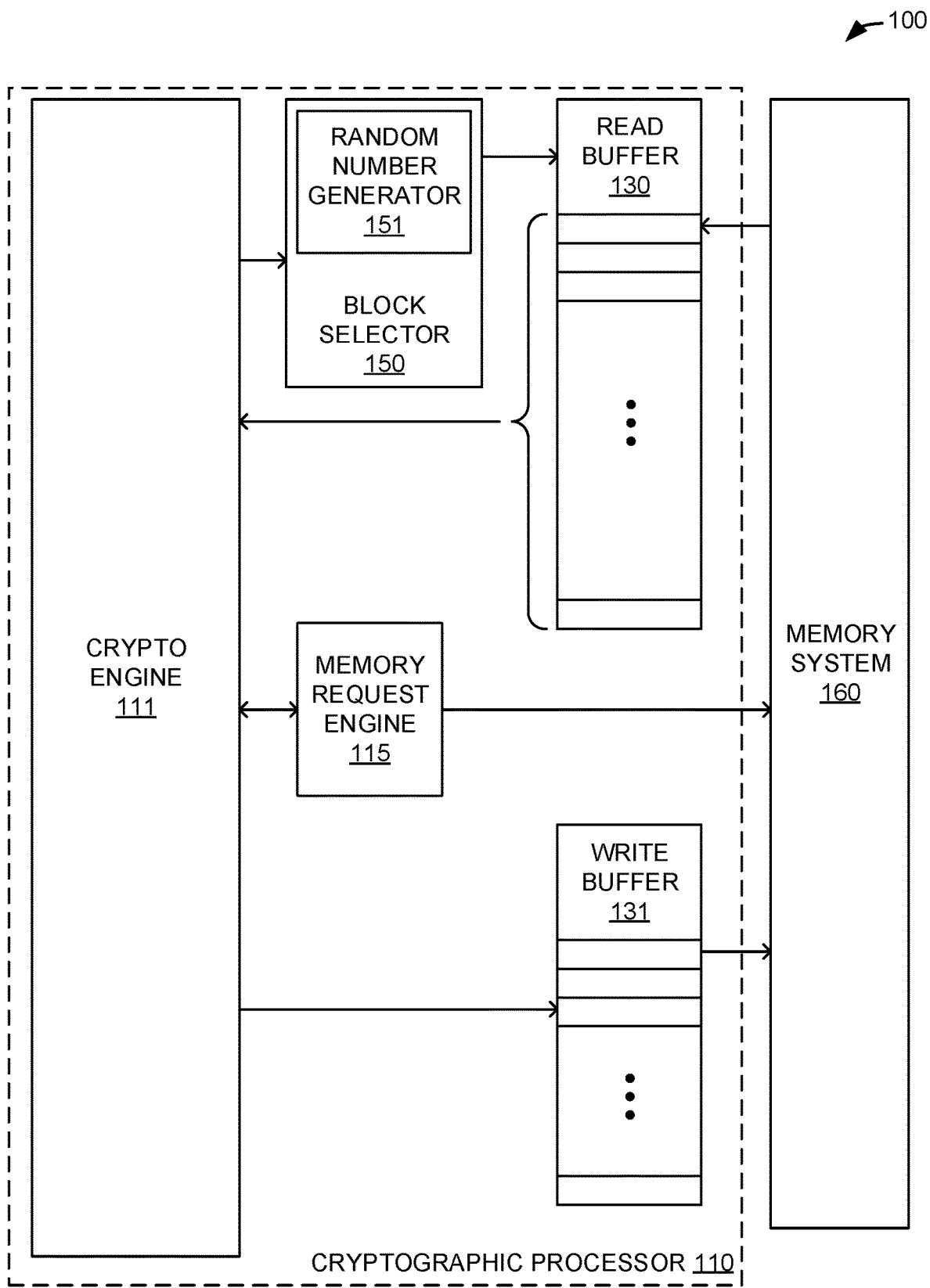
FIG. 1 is a block diagram of a cryptographic processing system.

FIG. 1 is a block diagram of a cryptographic processing system. In FIG. 1, cryptographic processing system 100 comprises cryptographic processor 110 and memory system 160. Cryptographic processor 110 includes cryptographic engine 111, memory request engine 115, read buffer 130, write buffer 131, and block selector 150. Block selector 150 includes random number generator 151. Read buffer 130 is operatively coupled to block selector 150, memory system 160, and cryptographic engine 111. Block selector 150 is operatively coupled to cryptographic engine 111 and read buffer 130. Memory request engine 115 is operatively coupled to cryptographic engine 111 and memory system 160. Write buffer 131 is operatively coupled to cryptographic engine 111 and memory system 160.

Cryptographic engine 111 can perform cryptographic processing on fixed length strings of bits. These fixed length strings of bits are referred to as blocks. The length of this bit string is the block size. For example, cryptographic engine 111 can perform cryptographic processing (e.g., cipher and decipher) that follows the Data Encryption Standard (DES) which uses a block size of 64 bits (8 bytes). In another example, cryptographic engine 111 can perform cryptographic processing that conforms to the Advanced Encryption Standard (AES) which uses a block size of 128 bits (16 bytes). Cryptographic engine 111 may also perform cryptographic processing according to other block cipher algorithms.

Memory request engine 115 is responsive to cryptographic engine 111. Memory request engine 115 is responsive to cryptographic engine 111 to generate read requests to retrieve data from memory system 160 for use by cryptographic engine 111. Memory request engine 115 is responsive to cryptographic engine 111 to generate write requests to store data processed by cryptographic engine 111 into memory system 160. Memory request engine 115 may use direct memory access (DMA) techniques and/or protocols to interface with memory system 160. In response to read requests from memory request engine 115, memory system 160 returns read data to cryptographic processor 110. Read data returned from memory system 160 is written into read buffer 130 by cryptographic processor 110. Data in read buffer 130 is stored in read buffer 130 until it is sent to cryptographic engine 111 for processing.

Memory system 160 can comprise a memory controller, memory modules, and/or memory devices. Memory system 160 may include a memory controller and memory components that are integrated circuit type devices, such as are commonly referred to as "chips." A memory controller manages the flow of data going to and from memory devices and/or memory modules. A memory controller may couple to multiple processing devices.

For example, in addition to cryptographic processor 110, memory system 160 may couple data going to and from memory devices to at least one additional processor. This processor may be referred to as a "compute engine," "computing engine," "graphics processor," "rendering engine," "processing unit," "accelerator", "offload engine," and/or GPU. This processor may include and/or be a heterogeneous processing unit that includes the functions of one or more of a CPU, GPU, video processor, etc. This processor may include, or be, a serial-ATA (SATA), serial attached SCSI (SAS), eSATA, PATA, IEEE 1394, USB (all revisions), SCSI Ultra, FiberChannel, Infiniband, Thunderbolt, or other industry standard I/O interfaces (such as PCI-Express—PCIe). This processor may include, or be, a network processor unit (NPU) such as a TCP offload engine (TOE), a protocol translator (e.g., TCP over SATA, TCP over PCI-Express, accelerated SCSI interconnect, etc.), and/or a protocol packet translator. This processor may include, or be, a fixed function graphics processing unit, a digital signal processor (DSP), a signal path processor, a Fourier transform processor, an inverse Fourier transform processor, and/or a media format encoder/decoder (e.g., JPEG, DVX, AVI, MP2, MP3, MP4, Blu-ray, HD-DVD, DVD, etc.).

Memory components may be standalone devices, or may include multiple memory integrated circuit dies—such as components of a multi-chip module. A memory controller can be a separate, standalone chip, or integrated into another chip. For example, a memory controller may be included on a single die with a microprocessor (and/or with a cryptographic processor—e.g., cryptographic processor 110), or included as part of a more complex integrated circuit system such as a block of a system on a chip (SOC).

Memory system 160 can include multiple memory devices coupled together to form a block of storage space. Memory system 160 can include, but is not limited to, SRAM, DDR3, DDR4, DDR5, XDR, XDR2, GDDR3, GDDR4, GDDR5, LPDDR, and/or LPDDR2 and successor memory standards and technologies. Memory system 160 can include a stack of devices such as a through-silicon-via (TSV) stack and/or a hybrid memory cube (HMC). Further information about HMC is available from the Hybrid Memory Cube Consortium (http://hybridmemorycube.org/).

Read requests from request engine 115 may instruct memory system 160 to provide multiple data blocks. For example, a single read request from request engine 115 may instruct memory system 160 to provide 256 bits of data to be stored in read buffer 130. This is equivalent to 4 blocks of 64 bits, which is the cipher block size of DES. Likewise, write requests from request engine 115 may instruct memory system 160 to write multiple data blocks stored in write buffer 131.

In an embodiment, block selector 150 randomly selects entries (data blocks) in read buffer 130 for cryptographic processing by cryptographic engine 111. This random selection may be based on one or more random numbers generated by random number generator 151. The random selection may also be based on random numbers provided by a random number generator external to cryptographic processor 110. In this case, random number generator 151 may not be present.

The data blocks selected by block selector 150 may be successively confined to a single defined group until all of the data blocks in the group are selected (processed). In other words, block selector 150 may randomly select data blocks among a group (set) of data blocks until all of the data blocks in the group have been selected. Once all of the data blocks in the group have been selected, block selector 150 may proceed to a second group and start randomly selecting from among that group. In this manner, all of the data blocks within a group are processed before cryptographic engine 111 starts processing data blocks from another group. In an embodiment, these data block groups correspond to sets of data blocks that are received in response to a single read request sent to memory system 160.

In another embodiment, the data blocks selected by block selector 150 may span multiple groups. In other words, block selector 150 may randomly select data blocks among multiple groups (sets) of data blocks until all of the data blocks in those groups have been selected. Once all of the data blocks in the multiple groups have been selected, block selector 150 may proceed to a second set of multiple groups and start randomly selecting from among the set that spans these multiple groups. In an embodiment, these multiple data block groups correspond to sets of data blocks that are received in response to a corresponding multiple number of single read requests sent to memory system 160.

In another embodiment, the data blocks selected by block selector 150 may comprise any unprocessed (i.e., yet to be selected) data blocks stored in read buffer 130. In other words, block selector 150 may randomly select data blocks from any valid (i.e., unprocessed) location within read buffer 130. As new data blocks arrive in read buffer 130 from memory system 160, they become valid entries in read buffer 130 and available for random selection by block selector 150.

After processing by cryptographic engine 111, the results (i.e., processed data) are stored in write buffer 131. In an embodiment, the processed data stored to write buffer 131 may be stored in a random access fashion such that the location of the results in write buffer 131 corresponds to the order of locations of the associated input blocks of data in memory system 160.

In an embodiment, the processed data stored to write buffer 131 may be stored in write buffer 131 in the random order the associated data blocks were processed (i.e., selected from read buffer 130.) When the processed data is stored in write buffer 131 in a random location order, the data may be written to memory system 160 in a random access fashion such that the order of the locations of the results in memory system 160 corresponds to the order of associated read data in memory system 160. Alternatively, when the processed data is stored in write buffer 131 in a random location order, the data may be written to memory system 160 in that random location order and then reordered by software.

Figure 2A:
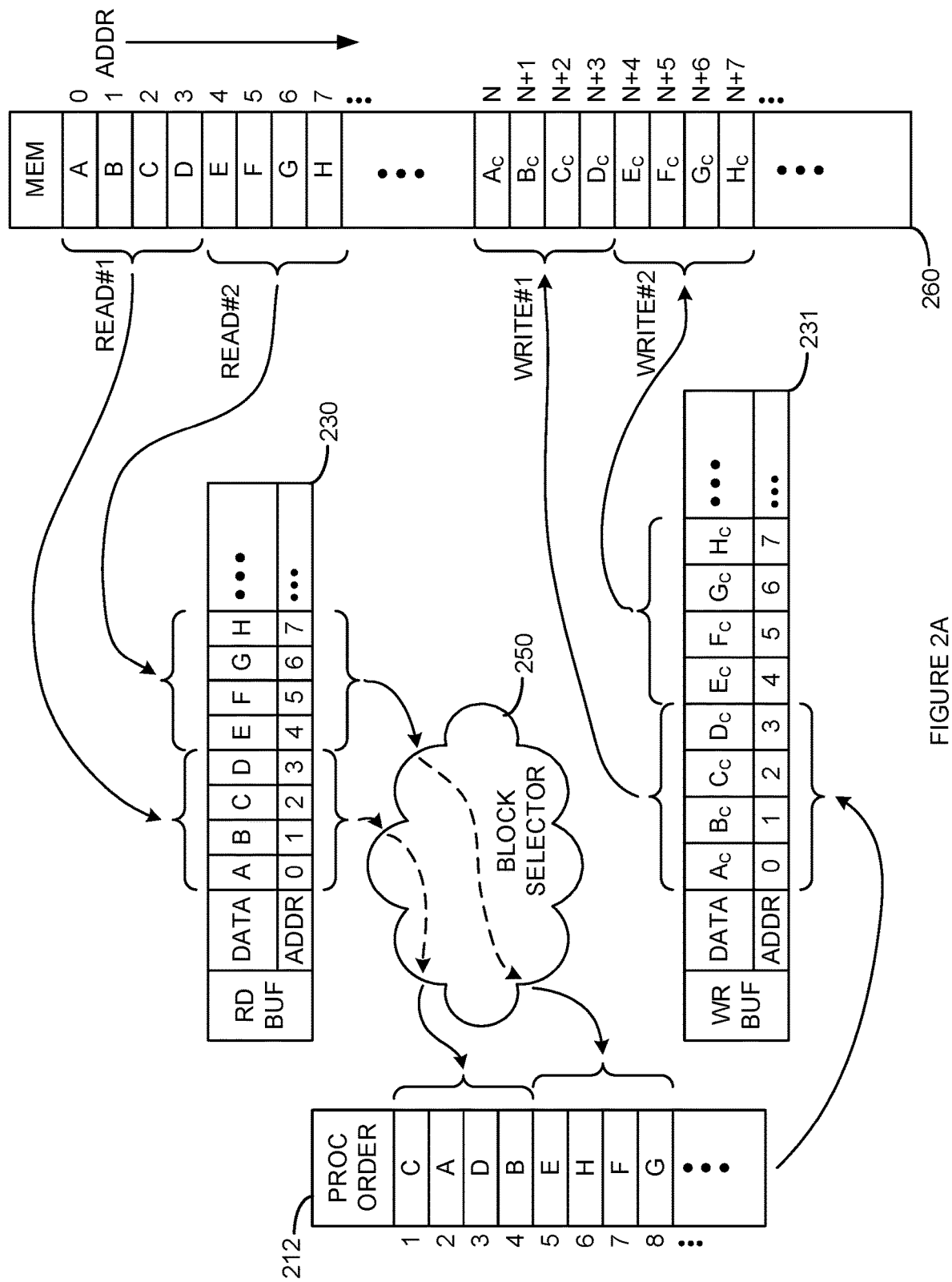
FIG. 2A is an illustration of randomized cryptographic processing within read sets of blocks.

FIG. 2A is an illustration of randomized cryptographic processing within read sets of blocks. The operations illustrated in FIG. 2A may be performed by one or more elements of cryptographic processing system 100. In FIG. 2A, blocks of data A-H are stored sequentially in memory system 260 starting at location zero (0). In other words, data block "A" is stored at memory location "0", data block "B" is stored at memory location "1", data block "C" is stored at memory location "2", and so on. Also illustrated in FIG. 2A, processed blocks of data $A_C$-$H_C$ are stored sequentially in memory system 260 starting at location N. In other words, data block "$A_C$" is stored at memory location "N", data block "$B_C$" is stored at memory location "N+1", data block "$C_C$" is stored at memory location "N+2", and so on. Each data block A-H and processed data block $A_C$-$H_C$ represent blocks of data that correspond in size to the block size of the cipher algorithm being performed. It should be understood that the use of the specific addresses "0" to "7" and "N" to "N+7" is for illustration purposes. The description given here can be extended to read and write areas of varying size and location. Additionally, the addresses used in memory request engine 115 may be logical addresses. The logical addresses may not directly identify physical storage elements. Physical storage locations may be identified by physical addresses, which may be obtained from the logical addresses by applying one or more translations. The translations may be performed in memory system 160, or elsewhere.

Data is read from memory system 260 and stored in read buffer 230 in sets of blocks that comprise multiple blocks of data. This is illustrated in FIG. 2A by the arrow labeled READ #1 indicating the copying of blocks A to D from locations 0 to 3, respectively, in memory system 260 to locations 0 to 3 in read buffer 230. Thus, locations 0 to 3 in read buffer 230 are part of a read set of blocks that was retrieved in response to READ #1. This operation is also illustrated by the arrow labeled READ #2 indicating the copying of blocks E to H from locations 4 to 7, respectively, in memory system 260 to locations 4 to 7 in read buffer 230. Thus, locations 4 to 7 in read buffer 230 are part of a read set of blocks that was retrieved in response to READ #2.

Block selector 250 randomly selects blocks from a read set until all of the blocks in a read set are processed. In other words, block selector 250 first selects blocks randomly from among blocks A-D until all of blocks A-D are processed, then selects blocks randomly from among blocks E-H until all of blocks E-H are processed, and so on.

In this manner, the blocks associated with READ #1 are processed in an order that is a random permutation of the order they were copied into read buffer 130 (and/or were stored in memory system 260.) Likewise, the blocks associated with READ #2 are processed in an order that is a random permutation of the order they were copied into read buffer 130 (and/or were stored in memory system 260.) The processing of the blocks associated with READ #1 is illustrated in FIG. 2A by the arrows from blocks A to D leading through block selector 250 to processing order 212. Processing order 212 illustrates an example random selection by block selector 250 where block C was processed first, block A second, block D third, and block B fourth. The processing of the blocks associated with READ #2 is illustrated in FIG. 2A by the arrows from blocks E to H leading through block selector 250 to processing order 212. Processing order 212 illustrates an example random selection by block selector 250 where block E was processed fifth, block H sixth, block F seventh, and block G eighth. It should be understood that FIG. 2A illustrates one of many possible sequences for processing order 212. In an embodiment, the sequences for processing order 212 may be determined by, for example, block selector 150, using random numbers as discussed herein. The use of random numbers to help determine processing order 212 can, upon commencement or execution of a cipher operation by cryptographic processor 110, make the order (i.e., processing order 212) in which the blocks (e.g., blocks A-H) are processed unpredictable (or at least more difficult to predict than a predetermined order.)

It should also be understood that FIG. 2A illustrates an embodiment where multiple data blocks (i.e., set of blocks) are received (retrieved) from memory in response to a single request. These blocks are then cryptographically processed in a random order. The randomization of the processing order is limited to the blocks received in response to a single read transaction. In other words, the blocks associated with a first read (e.g., READ #1) are processed in a random order, but are all processed before the blocks associated with the next read (e.g., READ #2) are processed. Thus, FIG. 2A is an illustration of randomized cryptographic processing within read sets of blocks.

After processing, cryptographically processed (e.g., encrypted or decrypted) versions of data blocks A-H are placed in write buffer 231. The cryptographically processed versions of data blocks A-H are illustrated as processed data blocks $A_C$-$H_C$, respectively. The placement of processed data blocks $A_C$-$H_C$ in write buffer 231 is illustrated in FIG. 2A by an arrow from processing order 212 to locations 0 to 3 of write buffer 231. Processed blocks $A_C$ to $D_C$ are shown being placed in locations 0 to 3, respectively, of write buffer 231. It should be noted that processed blocks $A_C$ to $D_C$ are placed in write buffer 231 in the same location order that the corresponding unprocessed blocks A to D were placed in read buffer 230—even though blocks A to D were processed in a random order (by, for example, cryptographic engine 111) into cryptographically processed versions $A_C$ to $D_C$.

Data is written to memory system 260 from write buffer 231 in sets of blocks that comprise multiple blocks of data. This is illustrated in FIG. 2A by the arrow labeled WRITE #1 indicating the copying of processed blocks $A_C$ to $D_C$ from locations 0 to 3, respectively, in write buffer 231 to locations N to N+3 of memory system 260. Thus, locations 0 to 3 in write buffer 231 are part of a write set of blocks that is written in response to WRITE #1. This operation is also illustrated in FIG. 2A by the arrow labeled WRITE #2 indicating the copying of processed blocks $E_C$ to $H_C$ from locations 4 to 7, respectively, in write buffer 231 to locations N+4 to N+7 of memory system 260. Thus, locations 4 to 7 in write buffer 231 are part of a write set of blocks that is written in response to WRITE #2. Thus, it should be apparent that after being processed in a random order (at least within sets of blocks), the memory location order (in memory system 260) of blocks A-H corresponds to the memory location order (in memory system 260) of processed blocks $A_C$-$H_C$.

Figure 2B:
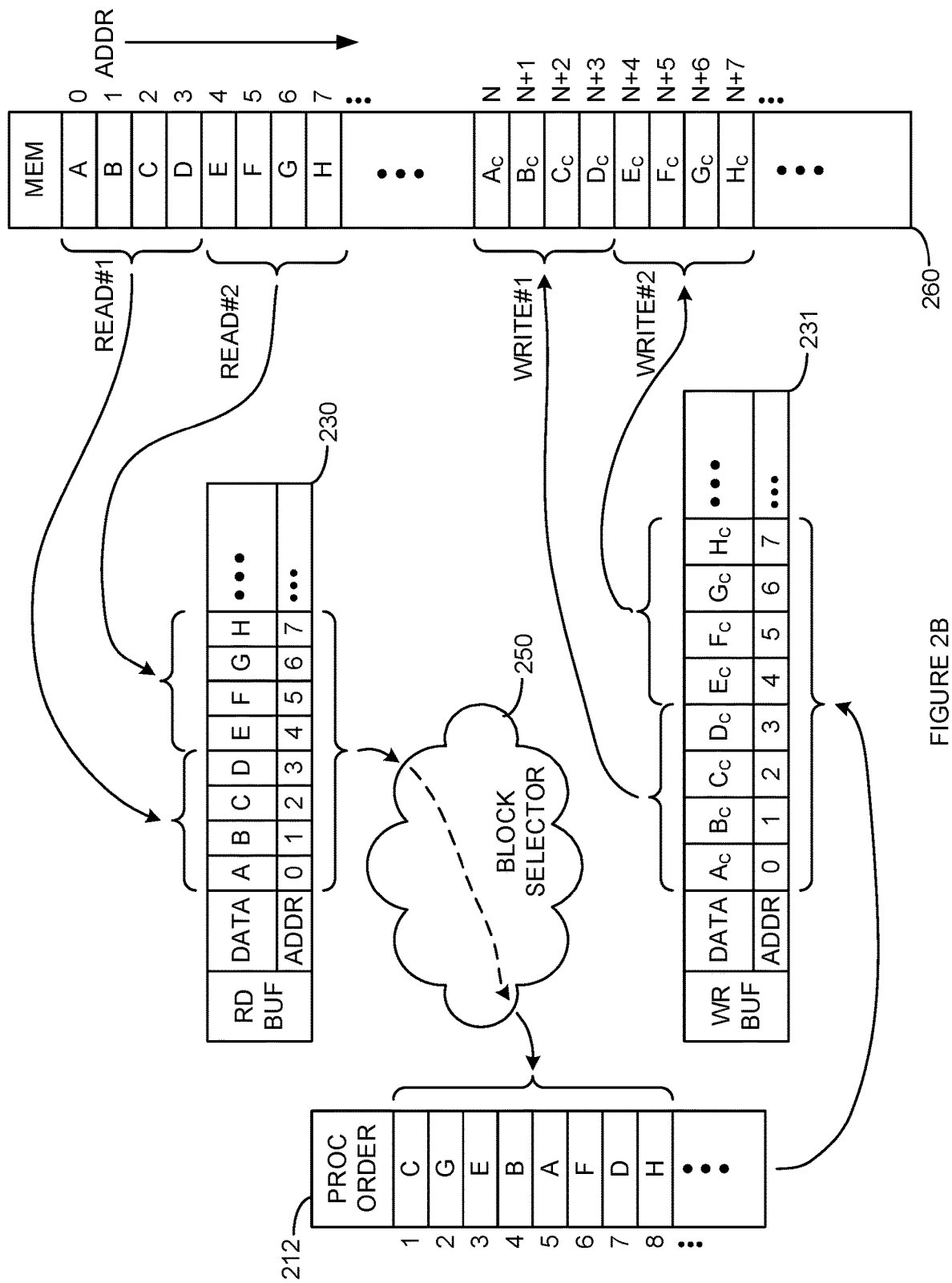
FIG. 2B is an illustration of randomized cryptographic processing across read sets of blocks and using ordered write sets.

FIG. 2B is an illustration of randomized cryptographic processing across read sets of blocks and using ordered write sets. The operations illustrated in FIG. 2B may be performed by one or more elements of cryptographic processing system 100. In FIG. 2B, blocks of data A-H are stored sequentially in memory system 260 starting at location zero (0). In other words, data block "A" is stored at memory location "0", data block "B" is stored at memory location "1", data block "C" is stored at memory location "2", and so on. Also illustrated in FIG. 2B, processed blocks of data $A_C$-$H_C$ are stored sequentially in memory system 260 starting at location N. In other words, data block "$A_C$" is stored at memory location "N", data block "$B_C$" is stored at memory location "N+1", data block "$C_C$" is stored at memory location "N+2", and so on. Each data block A-H and processed data block $A_C$-$H_C$ represent blocks of data that correspond in size to the block size of the cipher algorithm being performed.

Data is read from memory system 260 and stored in read buffer 230 in sets of blocks that comprise multiple blocks of data. This is illustrated in FIG. 2B by the arrow labeled READ #1 indicating the copying of blocks A to D from locations 0 to 3, respectively, in memory system 260 to locations 0 to 3 in read buffer 230. Thus, locations 0 to 3 in read buffer 230 are part of a read set of blocks that was retrieved in response to READ #1. This is also illustrated by the arrow labeled READ #2 indicating the copying of blocks E to H from locations 4 to 7, respectively, in memory system 260 to locations 4 to 7 in read buffer 230. Thus, locations 4 to 7 in read buffer 230 are part of a read set of blocks that was retrieved in response to READ #2.

Block selector 250 randomly selects blocks from read buffer 230 for processing. In an embodiment, block selector 250 randomly selects blocks from a plurality of read sets until all of the blocks in those read sets are processed. In other words, block selector 250 may first select blocks randomly from among blocks A-H until all of blocks A-H are processed, then selects blocks randomly from among other blocks in read buffer 230, and so on. In another embodiment, block selector 250 may randomly select blocks from read buffer 230 without regard to which read request caused a particular block to be read from memory system 260. A weighting or queueing scheme (e.g., random fair queueing, random early detection, weighted random early detection, and random early detection In/Out) to the random selection of blocks in read buffer 230 may be implemented to ensure blocks that have been in read buffer 230 are eventually selected within a reasonable period of time.

In this manner, the blocks associated with READ #1 and READ #2 are processed in an order that is a random permutation of the order they were read into read buffer 130 (and/or were stored in memory system 260.) The processing of the blocks in read buffer 230 is illustrated in FIG. 2B by the arrow from blocks A to H leading through block selector 250 to processing order 212. Processing order 212 illustrates an example random selection where block C (from READ #1) was processed first, block G (from READ #2) second, block E third (from READ #2), block B (from READ #1) fourth, block A (from READ #1) fifth, block F (from READ #2) sixth, block D (from READ #1) seventh, and block H (from READ #2) eighth.

Accordingly, it should be understood that FIG. 2B illustrates an embodiment where multiple data blocks (i.e., set of blocks) are received (retrieved) from memory in response to multiple requests. These blocks are then cryptographically processed in a random order. The randomization of the processing order is limited to the blocks already received and not processed, but is also not limited to those blocks received in response to a single read transaction. In other words, the blocks associated with a first read (e.g., READ #1) are processed in a random order randomly intermingled with the processing of randomly selected blocks associated with at least one other (e.g., the next—READ #2) read transaction. Thus, FIG. 2B is an illustration of cryptographic processing with a processing order randomized across read sets of blocks.

After processing, cryptographically processed (e.g., encrypted or decrypted) versions of data blocks A-H are placed in write buffer 231. The cryptographically processed versions of data blocks A-H are illustrated as processed data blocks $A_C$-$H_C$, respectively. The placement of processed data blocks $A_C$-$H_C$ in write buffer 231 is illustrated in FIG. 2B by an arrow from processing order 212 to locations 0 to 7 of write buffer 231. Processed blocks $A_C$ to $H_C$ are shown being placed in locations 0 to 7, respectively, of write buffer 231. It should be noted that processed blocks $A_C$ to $H_C$ are placed in write buffer 231 in the same location order that the corresponding unprocessed blocks A to H were placed in read buffer 230—even though blocks A to H were processed in a random order (by, for example, cryptographic engine 111) into cryptographically processed versions $A_C$ to $H_C$.

Data is written to memory system 260 from write buffer 231 in sets of blocks that comprise multiple blocks of data. This is illustrated in FIG. 2B by the arrow labeled WRITE #1 indicating the copying of processed blocks $A_C$ to $D_C$ from locations 0 to 3, respectively, in write buffer 231 to locations N to N+3 of memory system 260. Thus, locations 0 to 3 in write buffer 231 are part of a write set of blocks that is written in response to WRITE #1. This is also illustrated in FIG. 2B by the arrow labeled WRITE #2 indicating the copying of processed blocks $E_C$ to $H_C$ from locations 4 to 7, respectively, in write buffer 231 to locations N+4 to N+7 of memory system 260. Thus, locations 4 to 7 in write buffer 231 are part of a write set of blocks that is written in response to WRITE #2. Thus, it should be apparent that after being processed in a random order that encompasses multiple read sets, the memory location order (in memory system 260) of blocks A-H corresponds to the memory location order (in memory system 260) of processed blocks $A_C$-$H_C$.

Figure 2C:
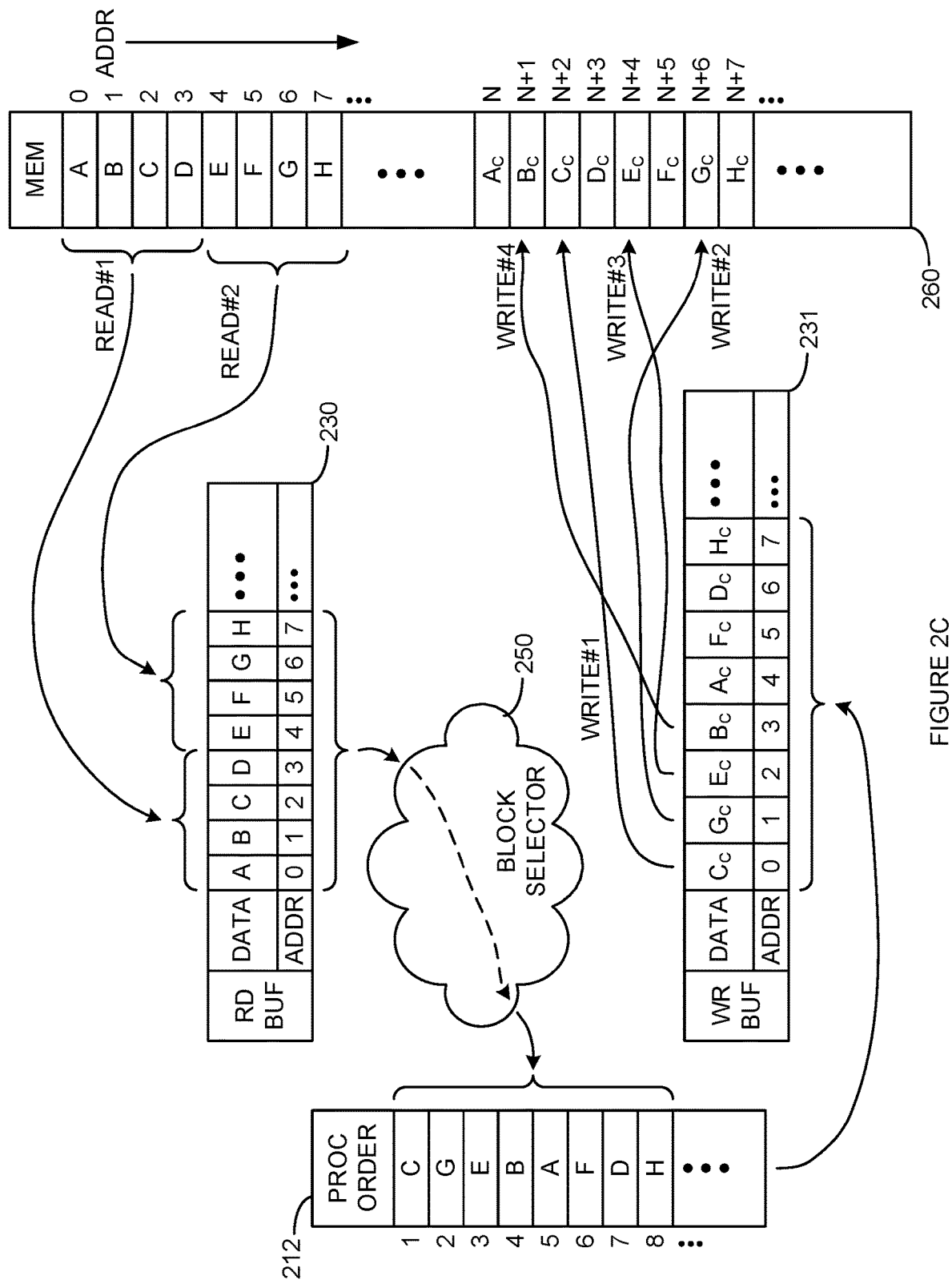
FIG. 2C is an illustration of randomized cryptographic processing across read sets of blocks with write transactions ordering the blocks in memory.

FIG. 2C is an illustration of randomized cryptographic processing across read sets of blocks with write transactions ordering the blocks in memory. The operations illustrated in FIG. 2C may be performed by one or more elements of cryptographic processing system 100. In FIG. 2C, blocks of data A-H are stored sequentially in memory system 260 starting at location zero (0). In other words, data block "A" is stored at memory location "0", data block "B" is stored at memory location "1", data block "C" is stored at memory location "2", and so on. Also illustrated in FIG. 2C, processed blocks of data $A_C$-$H_C$ are stored sequentially in memory system 260 starting at location N. In other words, data block "$A_C$" is stored at memory location "N", data block "$B_C$" is stored at memory location "N+1", data block "$C_C$" is stored at memory location "N+2", and so on. Each data block A-H and processed data block $A_C$-$H_C$ represent blocks of data that correspond in size to the block size of the cipher algorithm being performed.

Data is read from memory system 260 and stored in read buffer 230 in sets of blocks that comprise multiple blocks of data. This is illustrated in FIG. 2C by the arrow labeled READ #1 indicating the copying of blocks A to D from locations 0 to 3, respectively, in memory system 260 to locations 0 to 3 in read buffer 230. Thus, locations 0 to 3 in read buffer 230 are part of a read set of blocks that was retrieved in response to READ #1. This is also illustrated by the arrow labeled READ #2 indicating the copying of blocks E to H from locations 4 to 7, respectively, in memory system 260 to locations 4 to 7 in read buffer 230. Thus, locations 4 to 7 in read buffer 230 are part of a read set of blocks that was retrieved in response to READ #2.

Block selector 250 randomly selects blocks from read buffer 230 for processing. In an embodiment, block selector 250 randomly selects blocks from a plurality of read sets until all of the blocks in those read sets are processed. In other words, block selector 250 may first select blocks randomly from among blocks A-H until all of blocks A-H are processed, then selects blocks randomly from among other blocks in read buffer 230, and so on. In another embodiment, block selector 250 may randomly selects blocks from read buffer 230 without regard to which read request caused a particular block to be read from memory system 260. A weighting or queueing scheme (e.g., random fair queueing, random early detection, weighted random early detection, and random early detection In/Out) to the random selection of blocks in read buffer 230 may be implemented to ensure blocks that have been in read buffer 230 are eventually selected within a reasonable period of time.

In this manner, the blocks associated with READ #1 and READ #2 are processed in an order that is a random permutation of the order they were read into read buffer 130 (and/or were stored in memory system 260.) The processing of the blocks in read buffer 230 is illustrated in FIG. 2B by the arrow from blocks A to H leading through block selector 250 to processing order 212. Processing order 212 illustrates an example random selection where block C (from READ #1) was processed first, block G (from READ #2) second, block E third (from READ #2), block B (from READ #1) fourth, block A (from READ #1) fifth, block F (from READ #2) sixth, block D (from READ #1) seventh, and block H (from READ #2) eighth.

Accordingly, it should be understood that FIG. 2C illustrates an embodiment where multiple data blocks (i.e., set of blocks) are received (retrieved) from memory in response to multiple requests. These blocks are then cryptographically processed in a random order. The randomization of the processing order is limited to the block already received and not processed, but is not limited to those blocks received in response to a single read transaction. In other words, the blocks associated with a first read (e.g., READ #1) are processed in a random order randomly intermingled with the processing of randomly selected blocks associated with at least one other (e.g., the next—READ #2) read transaction. Thus, FIG. 2C is an illustration of at least randomized cryptographic processing across read sets of blocks.

After processing, cryptographically processed (e.g., encrypted or decrypted) versions of data blocks A-H are placed in write buffer 231 in a location order that corresponds to the order they were processed. The cryptographically processed versions of data blocks A-H are illustrated as processed data blocks $A_C$-$H_C$, respectively. The placement of processed data blocks $A_C$-$H_C$ in write buffer 231 is illustrated in FIG. 2C by an arrow from processing order 212 to locations 0 to 7 of write buffer 231. In FIG. 2C, block $C_C$, which was processed first, is placed in location 0 of write buffer 231; block $G_C$, which was processed second, is placed in location 1; block $E_C$, which was processed third, is placed in location 2; block $B_C$, which was processed fourth, is placed in location 3; block $A_C$, which was processed fifth, is placed in location 4; block $F_C$, which was processed sixth, is placed in location 5; block $D_C$, which was processed seventh, is placed in location 6; and, block $H_C$, which was processed eighth, is placed in location 7.

It should be noted that processed blocks $A_C$ to $H_C$ are placed in write buffer 231 in a location order that corresponds to the random order blocks A-H were processed (by, for example, cryptographic engine 111) into cryptographically processed versions $A_C$ to $H_C$.

Data is written to memory system 260 from write buffer 231 such that the memory location order (in memory system 260) of blocks A-H corresponds to the memory location order (in memory system 260) of processed blocks $A_C$-$H_C$. This may require write transactions that write less than a whole set of data blocks (e.g., writes of only one data block.) This is illustrated in FIG. 2C by the arrows labeled WRITE #1 through WRITE #4 indicating the copying of processed blocks $C_C$, $G_C$, $D_C$, and $B_C$ from locations 0 to 3, respectively, in write buffer 231 to locations N+2, N+6, N+4, and N+1 of memory system 260. Thus, it should be apparent that after being processed in a random order that encompasses multiple read sets, the memory location order (in memory system 260) of blocks A-H corresponds to the memory location order (in memory system 260) of processed blocks $A_C$-$H_C$.

Figure 2D:
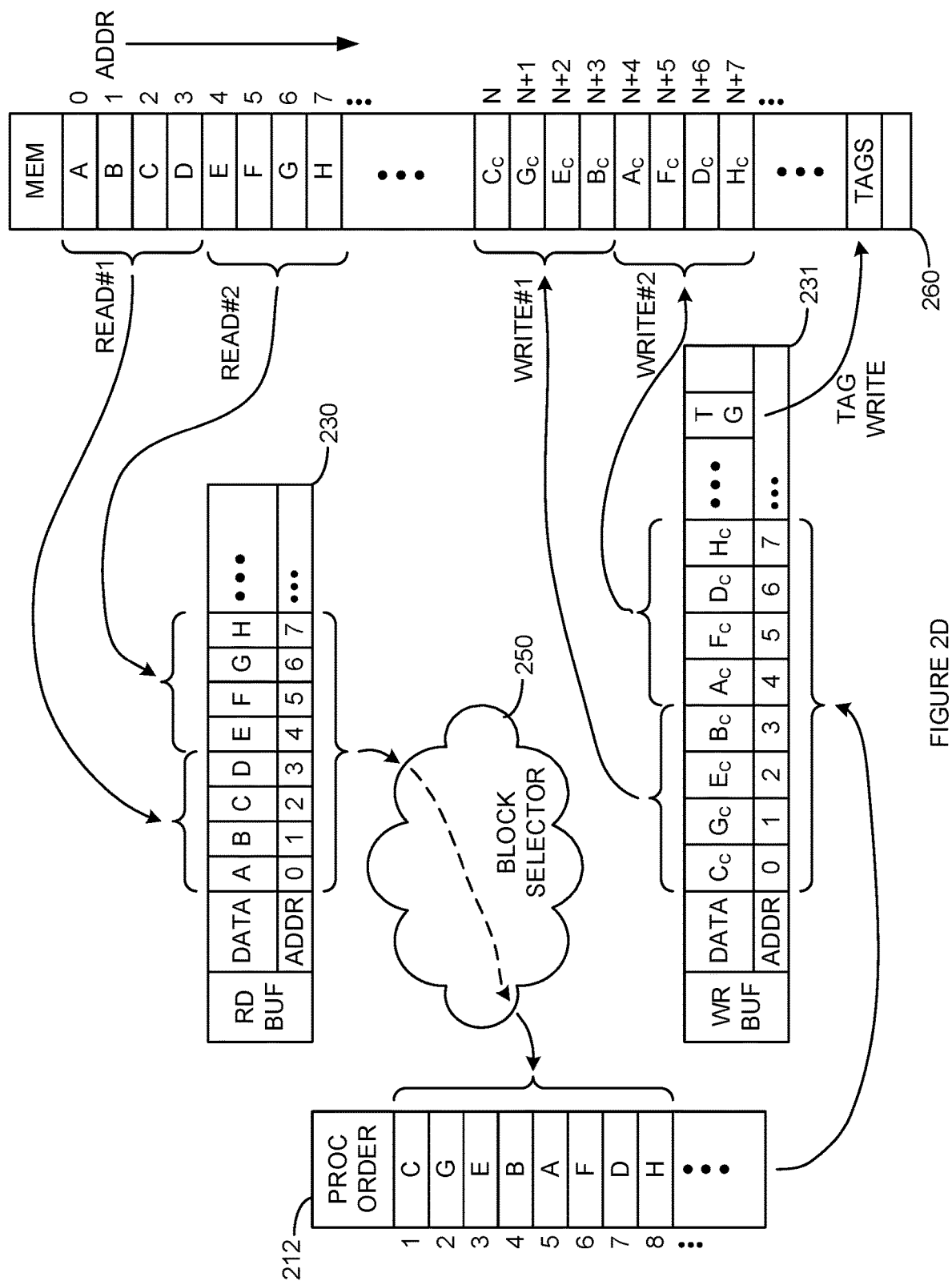
FIG. 2D is an illustration of randomized cryptographic processing across read sets of blocks with randomly ordered block sets written to memory.

FIG. 2D is an illustration of randomized cryptographic processing across read sets of blocks with randomly ordered block sets written to memory. The operations illustrated in FIG. 2D may be performed by one or more elements of cryptographic processing system 100. In FIG. 2D, blocks of data A-H are stored sequentially in memory system 260 starting at location zero (0). In other words, data block "A" is stored at memory location "0", data block "B" is stored at memory location "1", data block "C" is stored at memory location "2", and so on. Also illustrated in FIG. 2D, processed blocks of data $A_C$-$H_C$ are stored out-of-order in memory system 260 starting at location N. In other words, data block "$C_C$" is stored at memory location "N"; data block "$G_C$" is stored at memory location "N+1"; data block "$E_C$" is stored at memory location "N+2"; data block "$B_C$" is stored at memory location "N+3"; data block "$A_C$" is stored at memory location "N+4"; data block "$F_C$" is stored at memory location "N+5"; data block "$D_C$" is stored at memory location "N+6"; and, data block "$H_C$" is stored at memory location "N+7". Each data block A-H and processed data block $A_C$-$H_C$ represent blocks of data that correspond in size to the block size of the cipher algorithm being performed.

Data is read from memory system 260 and stored in read buffer 230 in sets of blocks that comprise multiple blocks of data. This is illustrated in FIG. 2D by the arrow labeled READ #1 indicating the copying of blocks A to D from locations 0 to 3, respectively, in memory system 260 to locations 0 to 3 in read buffer 230. Thus, locations 0 to 3 in read buffer 230 are part of a read set of blocks that was retrieved in response to READ #1. This is also illustrated by the arrow labeled READ #2 indicating the copying of blocks E to H from locations 4 to 7, respectively, in memory system 260 to locations 4 to 7 in read buffer 230. Thus, locations 4 to 7 in read buffer 230 are part of a read set of blocks that was retrieved in response to READ #2.

Block selector 250 randomly selects blocks from read buffer 230 for processing. In an embodiment, block selector 250 randomly selects blocks from a plurality of read sets until all of the blocks in those read sets are processed. In other words, block selector 250 may first select blocks randomly from among blocks A-H until all of blocks A-H are processed, then selects blocks randomly from among other blocks in read buffer 230, and so on. In another embodiment, block selector 250 may randomly selects blocks from read buffer 230 without regard to which read request caused a particular block to be read from memory system 260. A weighting or queueing scheme (e.g., random fair queueing, random early detection, weighted random early detection, and random early detection In/Out) to the random selection of blocks in read buffer 230 may be implemented to ensure blocks that have been in read buffer 230 are eventually selected within a reasonable period of time.

In this manner, the blocks associated with READ #1 and READ #2 are processed in an order that is a random permutation of the order they were read into read buffer 130 (and/or were stored in memory system 260.) The processing of the blocks in read buffer 230 is illustrated in FIG. 2D by the arrow from blocks A to H leading through block selector 250 to processing order 212. Processing order 212 illustrates an example random selection where block C (from READ #1) was processed first, block G (from READ #2) second, block E third (from READ #2), block B (from READ #1) fourth, block A (from READ #1) fifth, block F (from READ #2) sixth, block D (from READ #1) seventh, and block H (from READ #2) eighth.

Accordingly, it should be understood that FIG. 2D illustrates an embodiment where multiple data blocks (i.e., set of blocks) are received (retrieved) from memory in response to multiple requests. These blocks are then cryptographically processed in a random order. The randomization of the processing order is limited to the blocks already received and not processed, but is also not limited to those blocks received in response to a single read transaction. In other words, the blocks associated with a first read (e.g., READ #1) are processed in a random order randomly intermingled with the processing of randomly selected blocks associated with at least one other (e.g., the next—READ #2) read transaction. Thus, FIG. 2D is an illustration of at least randomized cryptographic processing across read sets of blocks.

After processing, cryptographically processed (e.g., encrypted or decrypted) versions of data blocks A-H are placed in write buffer 231 in a location order that corresponds to the order they were processed. The cryptographically processed versions of data blocks A-H are illustrated as processed data blocks $A_C$-$H_C$, respectively. The placement of processed data blocks $A_C$-$H_C$ in write buffer 231 is illustrated in FIG. 2D by an arrow from processing order 212 to locations 0 to 7 of write buffer 231. In FIG. 2D, block $C_C$, which was processed first, is placed in location 0 of write buffer 231; block $G_C$, which was processed second, is placed in location 1; block $E_C$, which was processed third, is placed in location 2; block $B_C$, which was processed fourth, is placed in location 3; block $A_C$, which was processed fifth, is placed in location 4; block $F_C$, which was processed sixth, is placed in location 5; block $D_C$, which was processed seventh, is placed in location 6; and, block $H_C$, which was processed eighth, is placed in location 7.

It should be noted that processed blocks $A_C$ to $H_C$ are placed in write buffer 231 in a location order that corresponds the random order blocks A-H were processed (by, for example, cryptographic engine 111) into cryptographically processed versions $A_C$ to $H_C$.

Data is written to memory system 260 from write buffer 231 in sets of blocks that comprise multiple blocks of data. This is illustrated in FIG. 2D by the arrow labeled WRITE #1 indicating the copying of processed blocks $C_C$, $G_C$, $E_C$, and $B_C$ from locations 0 to 3, respectively, in write buffer 231 to locations N to N+3 of memory system 260. Thus, locations 0 to 3 in write buffer 231 are part of a write set of blocks that is written in response to the single transaction WRITE #1. This is also illustrated in FIG. 2D by the arrow labeled WRITE #2 indicating the copying of processed blocks $A_C$, $F_C$, $D_C$, and $H_C$ from locations 4 to 7, respectively, in write buffer 231 to locations N+4 to N+7 of memory system 260. Thus, locations 4 to 7 in write buffer 231 are part of a write set of blocks that is written in response to WRITE #2. Thus, it should be apparent that after being processed in a random order that encompasses multiple read sets, the memory location order (in memory system 260) of processed blocks $A_C$-$H_C$ corresponds to the random processing order of blocks A-H.

In an embodiment, tags (TG) are also written to write buffer 231. These tags are written to memory system 260. This is illustrated in FIG. 2D by the arrow labeled TAG WRITE indicating the copying of TG from write buffer 231 to memory system 260. These tags convey information about the location ordering of processed blocks $A_C$-$H_C$. This information is sufficient for software (not shown in FIG. 2D) to reorder processed blocks $A_C$-$H_C$ in memory system 260 such that such that the memory location order (in memory system 260) of blocks A-H corresponds to the memory location order (in memory system 260) of the reordered processed blocks $A_C$-$H_C$.

Figure 3:
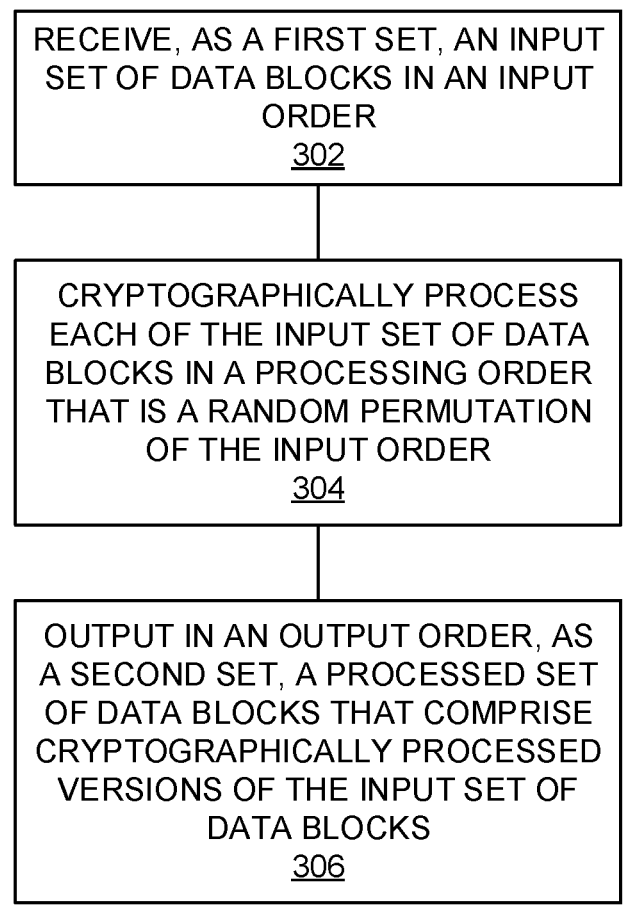
FIG. 3 is a flowchart illustrating cryptographic processing randomized within sets of data blocks.

FIG. 3 is a flowchart illustrating cryptographic processing randomized within sets of data blocks. The steps illustrated in FIG. 3 may be performed by one or more elements of cryptographic processing system 100. As a first set, an input set of data blocks are received in an input order (302). For example, read buffer 130 may receive, in response to a read request, a set of data blocks from memory system 160. These data blocks may arrive in a sequential order that corresponds to the locations in memory 160 where they were stored. Each data block of the set may have a size that corresponds to the block size of the cryptographic processing to be performed on the data blocks of the set.

Each of the input set of data blocks are cryptographically processed in a processing order that is a random permutation of the input order (304). For example, cryptographic engine 111 may repeatedly randomly select, for cryptographic processing, unprocessed data blocks from the set of data blocks until all of the data blocks received in response to the read request have been processed. This results in the data blocks in the set of data blocks being cryptographically processed in an order that is a random permutation of the order the data blocks were received (i.e., a random permutation of the sequential order in which the blocks were received/stored in memory 160.)

In an output order, as a second set, a processed set of data blocks that comprise cryptographically processed versions of the input set of data blocks are output (306). For example, cryptographically processed versions of the input set of data blocks (e.g., $A_C$-$H_C$) may be output for storage in memory system 160. These cryptographically processed versions of the input set of data blocks may be output for storage in memory 160 in a sequential order that corresponds to the locations in memory 160 where the corresponding input data blocks were stored. These cryptographically processed versions of the input set of data blocks may be output for storage in memory 160 in a sequential order that corresponds to the order these cryptographically processed versions were generated.

Figure 4:
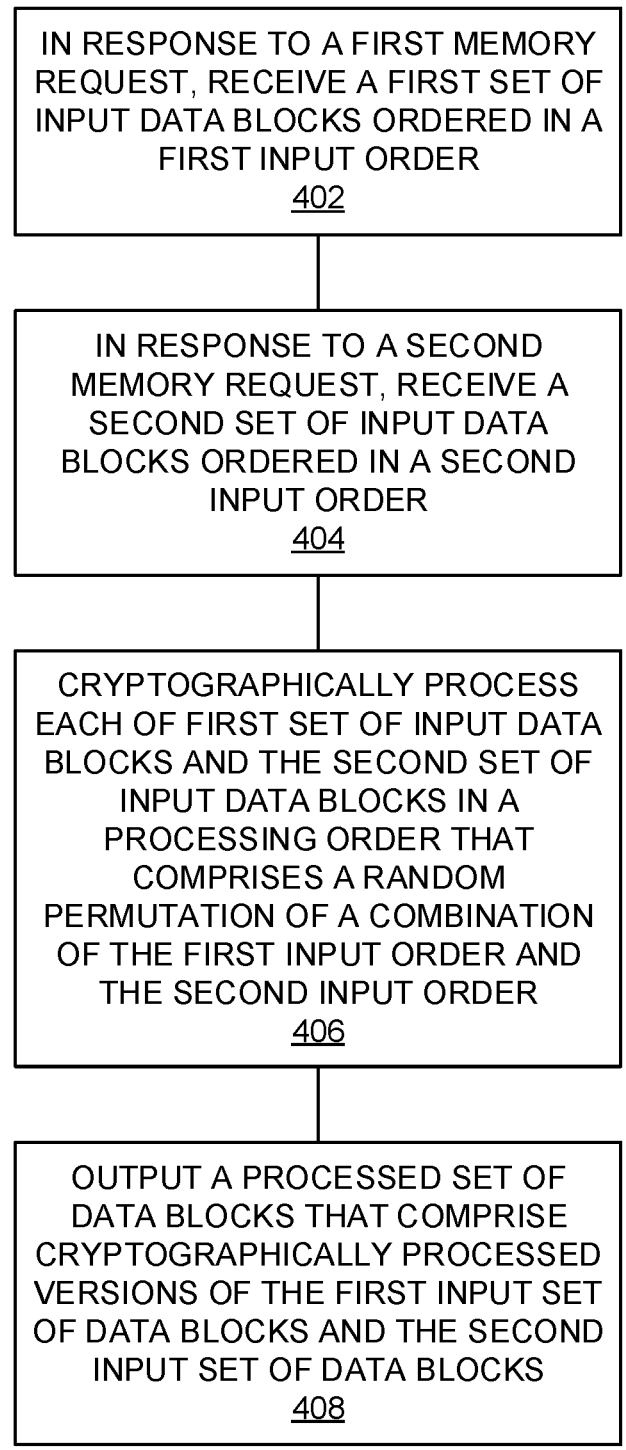
FIG. 4 is a flowchart illustrating cryptographic processing that is randomized across sets of data blocks.

FIG. 4 is a flowchart illustrating cryptographic processing that is randomized across sets of data blocks. The steps illustrated in FIG. 4 may be performed by one or more elements of cryptographic processing system 100. In response to a first memory request, a first set of input data blocks ordered in a first input order are received (402). For example, in response to a first memory request (e.g., READ #1), a first set of input data blocks (e.g., data blocks A-D) may be received in the sequential order corresponding to how they were stored in memory system 160.

In response to a second memory request, a second set of input data blocks ordered in a second input order are received (404). For example, in response to a first memory request (e.g., READ #2), a second set of input data blocks (e.g., data blocks E-H) may be received in the sequential order corresponding to how they were stored in memory system 160.

Each of the first set of input data blocks and the second set of input data blocks are cryptographically processed in a processing order that comprises a random permutation of a combination of the first input order and the second input order (406). For example, cryptographic processor 111 may process the first set of data blocks and the second set of data blocks by randomly selecting unprocessed data blocks from both the first set of data blocks and the second set of data blocks until all of the data blocks received in response to the first and second read requests have been processed. This results in the data blocks in the first and second sets of data blocks being cryptographically processed in an order that is a random permutation of the order the data blocks were received (i.e., a random permutation of the sequential order in which the first and second sets of data blocks were received/stored in memory 160.)

A processed set of data blocks that comprise cryptographically processed versions of the first input set of data blocks and the second input set of data blocks are output (408). For example, cryptographically processed versions of the first input set of data blocks (e.g., $A_C$-$D_C$) and cryptographically processed versions of the second input set of data blocks (e.g., $E_C$-$H_C$) may be output for storage in memory system 160. The cryptographically processed versions of the first set of input set of data blocks may be output for storage in memory 160 in a sequential order that corresponds to the locations in memory 160 where the corresponding ones of the first set of input data blocks were stored. The cryptographically processed versions of the second set of input set of data blocks may be output for storage in memory 160 in a sequential order that corresponds to the locations in memory 160 where the corresponding ones of the second set of input data blocks were stored. The cryptographically processed versions of the first and second set of input set of data blocks may be output for storage in memory 160 in a random order that corresponds to the order (i.e., permutation) of the order the first and second set of input data blocks were processed.

Figure 5:
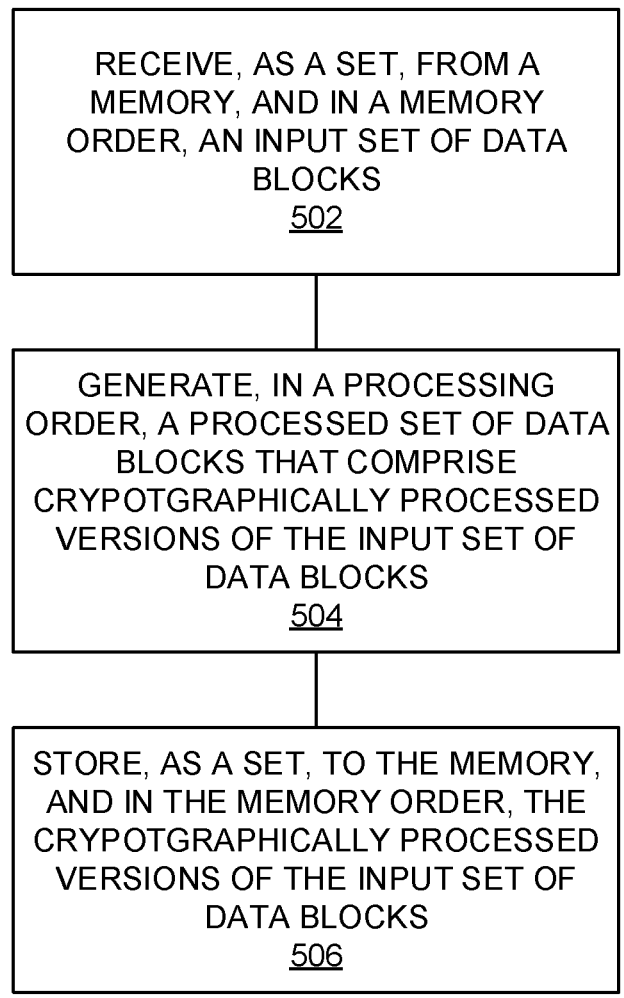
FIG. 5 is a flowchart illustrating a method of storing data blocks that were cryptographically processed in a random order.

FIG. 5 is a flowchart illustrating a method of storing data blocks that were cryptographically processed in a random order. The steps illustrated in FIG. 5 may be performed by one or more elements of cryptographic processing system 100. As a set, from a memory, and in a memory order, and input set of data blocks are received (502). For example, read buffer 130 may receive from memory system 160 an input set of data blocks (e.g., data blocks A-D). This input set of data blocks may be received in response to a read request. The data blocks of this input set may be received in the order that corresponds to the locations in which they were stored in memory 160 (e.g., sequentially from low memory address to high memory address or vice versa.)

In a processing order, a processed set of data blocks that comprise cryptographically processed versions of the input set of data blocks are generated (504). For example, in a random order, the blocks of the input set of data blocks (e.g., A-D) may be processed by cryptographic engine 111 to produce cryptographically processed versions (e.g., $A_C$-$D_C$.)

As a set, to the memory, and in the memory order, the cryptographically processed version of the input set of data blocks are stored (506). For example, the cryptographically processed versions (e.g., $A_C$-$D_C$) of the input data blocks may be stored in memory system 160. This stored set of data blocks may be stored by memory 160 in response to a write request. The cryptographically processed versions (e.g., $A_C$-$D_C$) of the input data blocks may be stored in memory system 160 in the order that corresponds to the locations in which the corresponding input data blocks were stored in memory 160 (e.g., sequentially from low memory address to high memory address or vice versa.)

Figure 6:
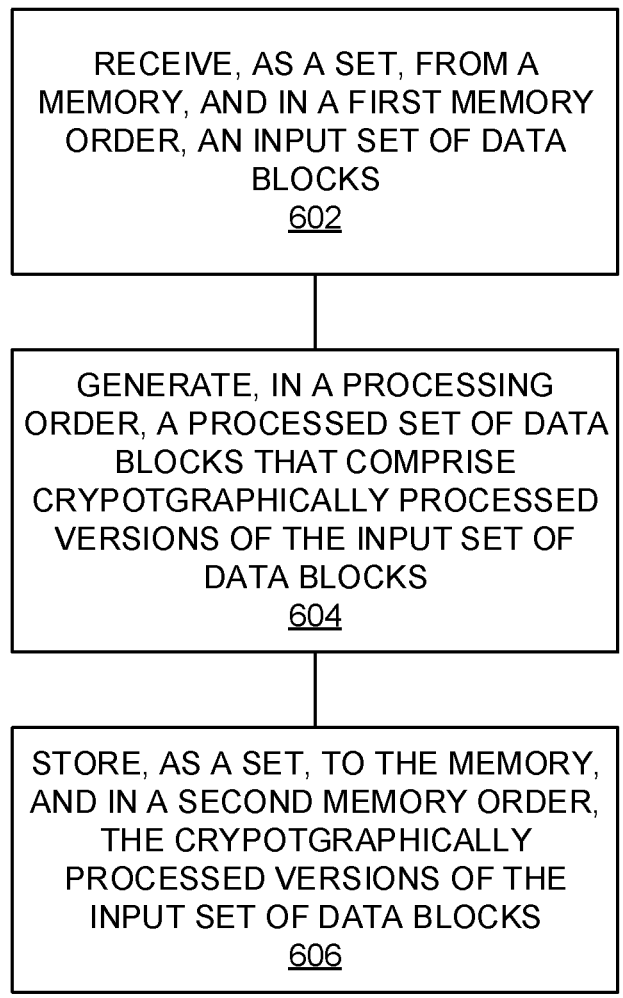
FIG. 6 is a flowchart illustrating a method of storing data blocks in a random order that were cryptographically processed in a random order.

FIG. 6 is a flowchart illustrating a method of storing data blocks in a random order that were cryptographically processed in a random order. The steps illustrated in FIG. 6 may be performed by one or more elements of cryptographic processing system 100. As a set, from a memory, and in a first memory order, an input set of data blocks are received (602). For example, input buffer 130 may receive from memory system 160 an input set of data blocks (e.g., data blocks A-D). This input set of data blocks may be received in response to a read request. The data blocks of this input set may be received in the order that corresponds to the locations in which they were stored in memory 160 (e.g., sequentially from low memory address to high memory address or vice versa.)

In a processing order, a processed set of data blocks that comprise cryptographically processed versions of the input set of data blocks are generated (604). For example, in a random order, the blocks of the input set of data blocks (e.g., A-D) may be processed by cryptographic engine 111 to produce cryptographically processed versions (e.g., $A_C$-$D_C$.)

As a set, to the memory, and in a second memory order, the cryptographically processed version of the input set of data blocks are stored (606). For example, the cryptographically processed versions (e.g., $A_C$-$D_C$) of the input data blocks may be stored in memory system 160. This stored set of data blocks may be stored by memory 160 in response to a write request. The cryptographically processed versions (e.g., $A_C$-$D_C$) of the input data blocks may be stored in memory system 160 in an order that corresponds to the order that the cryptographically processed versions of the input set of data blocks were generated.

Figure 7:
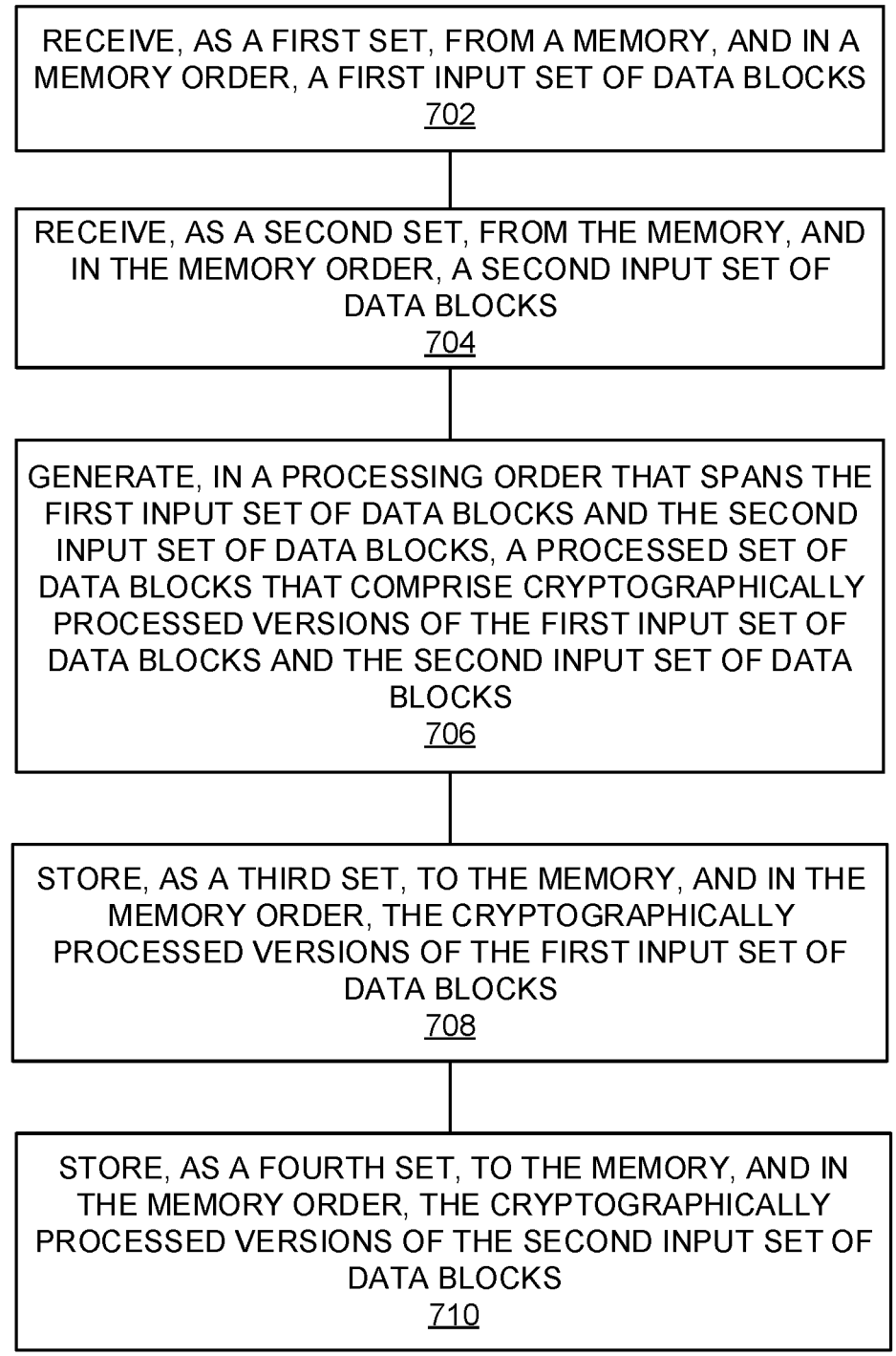
FIG. 7 is a flowchart illustrating a method of randomizing the order of cryptographic processing while receiving and storing the data blocks in a memory order.

FIG. 7 is a flowchart illustrating a method of randomizing the order of cryptographic processing while receiving and storing the data blocks in a memory order. The steps illustrated in FIG. 7 may be performed by one or more elements of cryptographic processing system 100. As a first set, from a memory, and in a memory order, a first input set of data blocks are received (702). For example, input buffer 130 may receive, from memory system 160, a first input set of data blocks (e.g., data blocks A-D). This first input set of data blocks may be received in response to a first read request (e.g., READ #1). The data blocks of this first input set may be received in the order that corresponds to the locations in which the first input set was stored in memory 160 (e.g., sequentially from low memory address to high memory address or vice versa.)

As a second set, from the memory, and in the memory order, a second input set of data blocks are received (704). For example, input buffer 130 may receive, from memory system 160, a second input set of data blocks (e.g., data blocks E-H). This second input set of data blocks may be received in response to a second read request (e.g., READ #2). The data blocks of this second input set may be received in the order that corresponds to the locations in which the second input set was stored in memory 160 (e.g., sequentially from low memory address to high memory address or vice versa.) The second input set may be received in the order that corresponds to where the second input set was stored in memory 160 relative to the first input set (e.g., sequentially—after the first set.)

In a processing order that spans the first input set and the second input set of data blocks, a processed set of data blocks that comprise cryptographically processed versions of the first input set of data blocks and the second input set of data blocks is generated (706). For example, in a random order that includes the intermingling of blocks from both sets, the blocks of the first and second input sets of data blocks (e.g., A-H) may be processed by cryptographic engine 111 to produce cryptographically processed versions (e.g., $A_C$-$H_C$.)

As a third set, to the memory, and in a third memory order, the cryptographically processed versions of the first input set of data blocks are stored (708). For example, the cryptographically processed versions (e.g., $A_C$-$D_C$) of the first set input data blocks may be stored in memory system 160. This first set of stored data blocks may be stored by memory 160 in response to a first write request. The cryptographically processed versions (e.g., $A_C$-$D_C$) of the input data blocks may be stored in memory system 160 in an order that corresponds to the order that the input set of data blocks were stored in memory system 160 (e.g., sequentially from low memory address to high memory address or vice versa.).

As a fourth set, to the memory, and in a fourth memory order, the cryptographically processed versions of the second input set of data blocks are stored (710). For example, the cryptographically processed versions (e.g., $E_C$-$H_C$) of the second set input data blocks may be stored in memory system 160. This second set of stored set of data blocks may be stored by memory 160 in response to a second write request. The cryptographically processed versions (e.g., $E_C$-$H_C$) of the input data blocks may be stored in memory system 160 in an order that corresponds to the order that the input set of data blocks were stored in memory system 160 (e.g., sequentially from low memory address to high memory address or vice versa.).

FIG. 8 is a flowchart illustrating a method of randomizing the order of cryptographic processing while storing the data blocks out of memory order. The steps illustrated in FIG. 8 may be performed by one or more elements of cryptographic processing system 100. As a first set, from a memory, and in a memory order, a first input set of data blocks are received (802). For example, input buffer 130 may receive, from memory system 160, a first input set of data blocks (e.g., data blocks A-D). This first input set of data blocks may be received in response to a first read request (e.g., READ #1). The data blocks of this first input set may be received in the order that corresponds to the locations in which the first input set was stored in memory 160 (e.g., sequentially from low memory address to high memory address or vice versa.)

As a second set, from the memory, and in the memory order, a second input set of data blocks are received (804). For example, input buffer 130 may receive, from memory system 160, a second input set of data blocks (e.g., data blocks E-H). This second input set of data blocks may be received in response to a second read request (e.g., READ #2). The data blocks of this second input set may be received in the order that corresponds to the locations in which the second input set was stored in memory 160 (e.g., sequentially from low memory address to high memory address or vice versa.) The second input set may be received in the order that corresponds to where the second input set was stored in memory 160 relative to the first input set (e.g., sequentially—after the first set.)

In a processing order that spans the first input set and the second input set of data blocks, a processed set of data blocks that comprise cryptographically processed versions of the first input set of data blocks and the second input set of data blocks is generated (806). For example, in a random order that includes the intermingling of blocks from both sets, the blocks of the first and second input sets of data blocks (e.g., A-H) may be processed by cryptographic engine 111 to produce cryptographically processed versions (e.g., $A_C$-$H_C$.)

As a third set, to the memory, and not in the memory order, a subset comprising cryptographically processed versions of the first input set of data blocks and the second input set of data blocks are stored (808). For example, a subset of the cryptographically processed versions from the first set input data blocks and the second set of input data blocks (e.g., $C_C$, $G_C$, $E_C$, and $B_C$—as illustrated in FIG. 2D) may be stored in memory system 160. This subset of stored set of data blocks may be stored by memory 160 in response to a first write request. This subset of the cryptographically processed versions (e.g., $C_C$, $G_C$, $E_C$, and $B_C$) of the first and second sets input data blocks may be stored in memory system 160 in an order that corresponds to the random order that the cryptographically processed versions of the input set of data blocks were generated.

As a fourth set, to the memory, and not in the memory order, a remainder subset comprising cryptographically processed versions of the first input set of data blocks and the second input set of data blocks are stored (810). For example, an unwritten subset of the cryptographically processed versions from the first set of input data blocks and the second set of input data blocks (e.g., $A_C$, $F_C$, $D_C$, and $H_C$—as illustrated in FIG. 2D) may be stored in memory system 160. This unwritten subset of stored set of data blocks may be stored by memory 160 in response to a second write request. This subset of the cryptographically processed versions (e.g., $A_C$, $F_C$, $D_C$, and $H_C$) of the first and second sets input data blocks may be stored in memory system 160 in an order that corresponds to the random order that the cryptographically processed versions of the input set of data blocks were generated.

Figure 9:
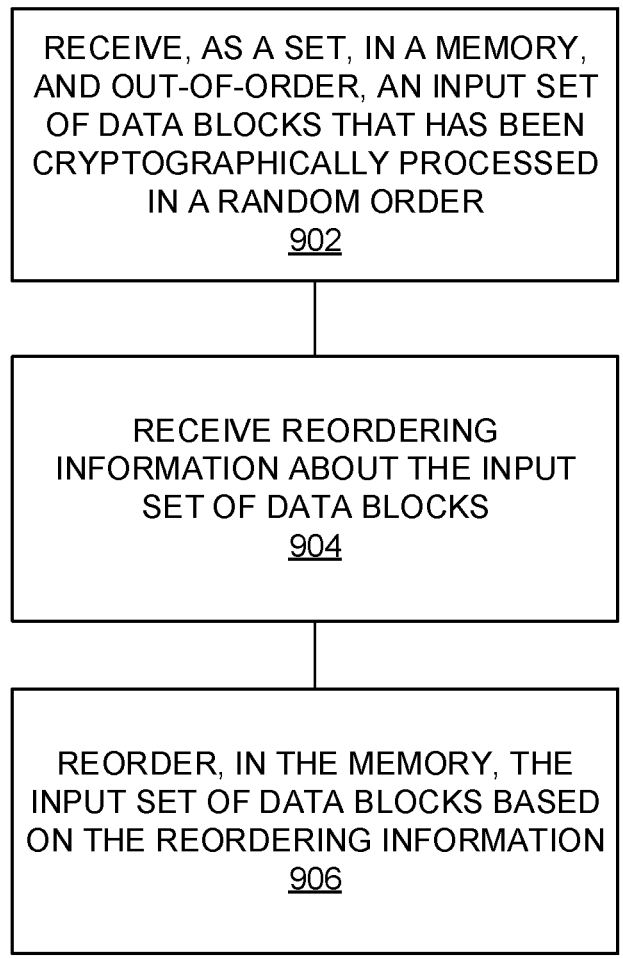
FIG. 9 is a method of processing out-of-order data blocks.

FIG. 9 is a method of processing out-of-order data blocks. The steps illustrated in FIG. 9 may be performed by one or more elements of cryptographic processing system 100. As a set, in a memory and out-of-order, an input set of data blocks that has been cryptographically processed is received (902). For example, memory system 160 may receive from write buffer 131, a cryptographically processed set of data blocks. These data blocks (e.g., $C_C$, $G_C$, $E_C$, and $B_C$—as illustrated in FIG. 2D) may be received out-of-order.

Reordering information about the input set of data blocks is received (904). For example, memory system 160 may receive tag information from write buffer 131. This tag information may relate the received (or sent) order of the first input set of data blocks to a desired order (e.g., the memory order that corresponds to the unprocessed data blocks.)

In the memory, the input set of data blocks are reordered based on the reordering information (906). For example, the data blocks (e.g., $C_C$, $G_C$, $E_C$, and $B_C$—as illustrated in FIG. 2D) which were received by memory 160 out-of-order may be reordered by software. The data blocks which were received by memory 160 out-of-order may be reordered in memory 160 into the memory order that corresponded to the unprocessed data blocks that served as input to cryptographic engine 111.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of cryptographic processing system 100, and its components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 10:
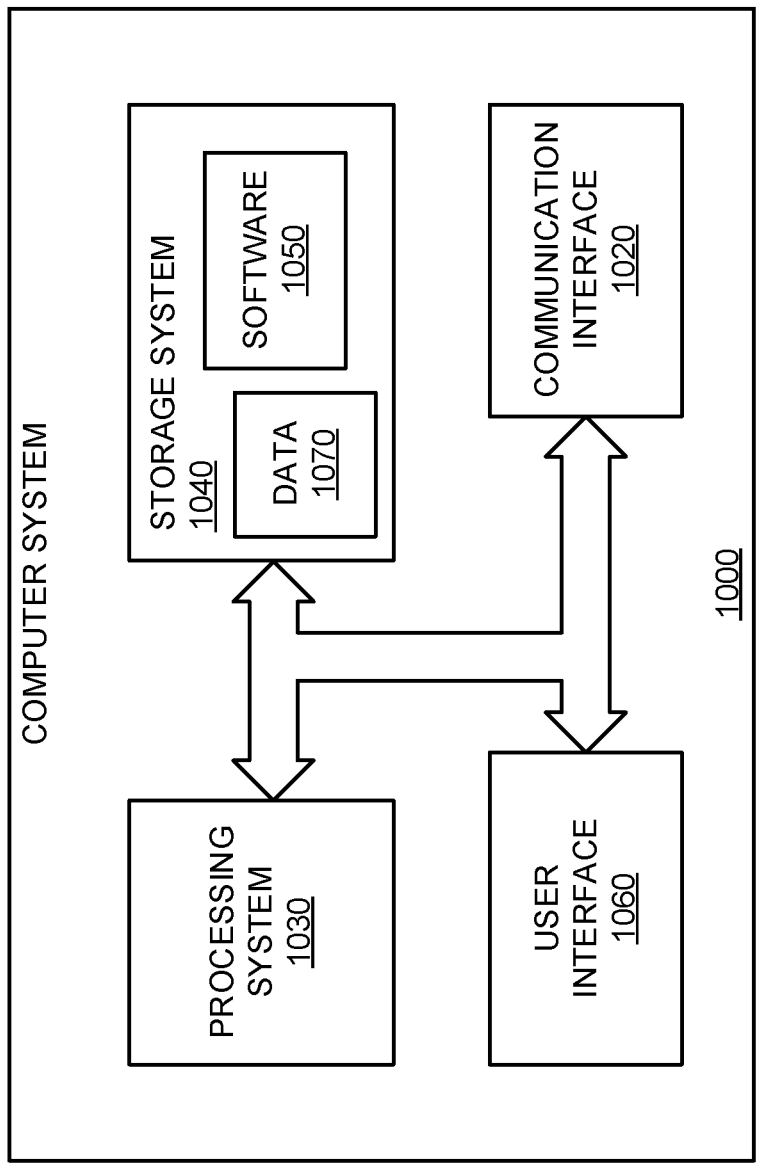
FIG. 10 is a block diagram of a computer system.

FIG. 10 illustrates a block diagram of a computer system. Computer system 1000 includes communication interface 1020, processing system 1030, storage system 1040, and user interface 1060. Processing system 1030 is operatively coupled to storage system 1040. Storage system 1040 stores software 1050 and data 1070. Processing system 1030 is operatively coupled to communication interface 1020 and user interface 1060. Computer system 1000 may comprise a programmed general-purpose computer. Computer system 1000 may include a microprocessor. Computer system 1000 may comprise programmable or special purpose circuitry. Computer system 1000 may be distributed among multiple devices, processors, storage, and/or interfaces that together comprise elements 1020-1070.

Communication interface 1020 may comprise a network interface, modem, port, bus, link, transceiver, or other communication device. Communication interface 1020 may be distributed among multiple communication devices. Processing system 1030 may comprise a microprocessor, microcontroller, logic circuit, or other processing device. Processing system 1030 may be distributed among multiple processing devices. User interface 1060 may comprise a keyboard, mouse, voice recognition interface, microphone and speakers, graphical display, touch screen, or other type of user interface device. User interface 1060 may be distributed among multiple interface devices. Storage system 1040 may comprise a disk, tape, integrated circuit, RAM, ROM, EEPROM, flash memory, network storage, server, or other memory function. Storage system 1040 may include computer readable medium. Storage system 1040 may be distributed among multiple memory devices.

Processing system 1030 retrieves and executes software 1050 from storage system 1040. Processing system 1030 may retrieve and store data 1070. Processing system 1030 may also retrieve and store data via communication interface 1020. Processing system 1050 may create or modify software 1050 or data 1070 to achieve a tangible result. Processing system may control communication interface 1020 or user interface 1060 to achieve a tangible result. Processing system 1030 may retrieve and execute remotely stored software via communication interface 1020.

Software 1050 and remotely stored software may comprise an operating system, utilities, drivers, networking software, and other software typically executed by a computer system. Software 1050 may comprise an application program, applet, firmware, or other form of machine-readable processing instructions typically executed by a computer system. When executed by processing system 1030, software 1050 or remotely stored software may direct computer system 1000 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A cryptographic processing device, comprising:
    circuitry to store, in an input buffer, a first set of data blocks in a first memory address order, the first set of data blocks arriving at the cryptographic processing device in the first memory address order which corresponds to locations in an external memory where the first set of data blocks are stored, and the circuitry to store, in the input buffer, a second set of data blocks in a second memory address order, the second set of data blocks arriving at the cryptographic processing device in the second memory address order which corresponds to locations in the external memory where the second set of data blocks are stored, where the first set of data blocks and the second set of data blocks are to be cryptographically processed, and where cryptographic processing is a one of ciphering and deciphering;
    a cryptographic engine to cryptographically process, in data block sized units, the first set of data blocks in a first randomly selected cryptographic processing order that is a permutation of the first memory address order and to store cryptographically processed versions of the first set of data blocks in an output buffer in a third memory address order that is determined by the first randomly selected cryptographic processing order and that is different from the first memory address order, the first randomly selected cryptographic processing order based at least in part on randomly selecting blocks from a subset of the first set of data blocks that have already arrived at cryptographic processing device, the cryptographic engine also to cryptographically process, in data block sized units, the second set of data blocks in a second randomly selected cryptographic processing order that is a permutation of the second memory address order and to store cryptographically processed versions of the second set of data blocks in the output buffer in a fourth memory address order that is determined by the second randomly selected cryptographic processing order and that is different from the second memory address order.

2. The cryptographic processing device of claim 1, wherein the second randomly selected cryptographic processing order is to be a permutation of a combination of the first memory address order and the second memory address order.

3. The cryptographic processing device of claim 1, wherein the first randomly selected cryptographic processing order provides resistance to differential power analysis.

4. The cryptographic processing device of claim 1, wherein the second randomly selected cryptographic processing order provides resistance to differential power analysis.

5. The cryptographic processing device of claim 1, wherein cryptographic processing is performed according to a block cipher algorithm.

6. The cryptographic processing device of claim 5, wherein the block cipher algorithm follows the Advanced Encryption Standard (AES).

7. The cryptographic processing device of claim 5, wherein the block cipher algorithm follows the Data Encryption Standard (DES).

8. A cryptographic processing device, comprising:
    a cryptographic processing engine, where cryptographic processing is a one of ciphering and deciphering;
    a read buffer to store a first set of data blocks in a first memory address order and a second set of data blocks in a second memory address order, the first set of data blocks arriving at the cryptographic processing device in the first memory address order which corresponds to locations in an external memory where the first set of data blocks are stored, and the second set of data blocks arriving at the cryptographic processing device in the second memory address order which corresponds to locations in the external memory where the second set of data blocks are stored;
    first circuitry to provide, to the cryptographic processing engine, the first set of data blocks from the read buffer in a first randomly selected cryptographic processing order that is a permutation of the first memory address order, the cryptographic processing engine to cryptographically process the first set of data blocks in the first randomly selected cryptographic processing order, the first randomly selected cryptographic processing order based at least in part on randomly selecting blocks from a subset of the first set of data blocks that have already arrived at cryptographic processing device, the first circuitry also to provide, to the cryptographic processing engine from the read buffer, the second set of data blocks in a second randomly selected cryptographic processing order that is a permutation of the second memory address order, the cryptographic processing engine to cryptographically process the second set of data blocks in the second randomly selected cryptographic processing order; and, second circuitry to store cryptographically processed versions of the first set of data blocks in an output buffer in a third memory address order that is determined by the first randomly selected cryptographic processing order and that is different from the first memory address order, the second circuitry also to store cryptographically processed versions of the second set of data blocks in the output buffer in a fourth memory address order that is determined by the second randomly selected cryptographic processing order and that is different from the second memory address order.

9. The cryptographic processing device of claim 8, wherein the second randomly selected cryptographic processing order is to be a permutation of a combination of the first memory address order and the second memory address order.

10. The cryptographic processing device of claim 8, wherein the first randomly selected cryptographic processing order provides resistance to differential power analysis.

11. The cryptographic processing device of claim 8, wherein the second randomly selected cryptographic processing order provides resistance to differential power analysis.

12. The cryptographic processing device of claim 8, wherein cryptographic processing is performed according to a block cipher algorithm.

13. The cryptographic processing device of claim 12, wherein the block cipher algorithm follows the Advanced Encryption Standard (AES).

14. The cryptographic processing device of claim 12, wherein the block cipher algorithm follows the Data Encryption Standard (DES).

15. A method, comprising:
providing, to an input buffer, a first set of data blocks in a first memory address order, the first set of data blocks arriving at the input buffer in the first memory address order which corresponds to locations in an external memory where the first set of data blocks are stored;
providing, to the input buffer, a second set of data blocks in a second memory address order, the second set of data blocks arriving at the input buffer in the second memory address order which corresponds to locations in the external memory where the second set of data blocks are stored, where the first set of data blocks and the second set of data blocks are to be cryptographically processed, and where cryptographic processing is a one of ciphering and deciphering;
providing, to a cryptographic processing engine, the first set of data blocks in a first randomly selected cryptographic processing order that is a permutation of the first memory address order, the first randomly selected cryptographic processing order based at least in part on randomly selecting blocks from a subset of the first set of data blocks that have already arrived at cryptographic processing device;
cryptographically processing, by the cryptographic processing engine, the first set of data blocks in the first randomly selected cryptographic processing order;
providing, to the cryptographic processing engine, the second set of data blocks in a second randomly selected cryptographic processing order that is a permutation of the second memory address order;
cryptographically processing, by the cryptographic processing engine, the second set of data blocks in the second randomly selected cryptographic processing order;
storing cryptographically processed versions of the first set of data blocks in an output buffer in a third memory address order that is determined by the first randomly selected cryptographic processing order and that is different from the first memory address order; and,
storing cryptographically processed versions of the second set of data blocks in the output buffer in a fourth memory address order that is determined by the second randomly selected cryptographic processing order and that is different from the second memory address order.

16. The method of claim 15, wherein the second randomly selected cryptographic processing order is to be a permutation of a combination of the first memory address order and the second memory address order.

17. The method of claim 15, wherein the first randomly selected cryptographic processing order provides resistance to differential power analysis.

18. The method of claim 15, wherein the second randomly selected cryptographic processing order provides resistance to differential power analysis.

19. The method of claim 15, wherein cryptographic processing is performed according to a block cipher algorithm.

20. The method of claim 19, wherein the block cipher algorithm follows an encryption standard.

* * * * *